(12) United States Patent
Smith et al.

(10) Patent No.: US 8,627,552 B2
(45) Date of Patent: Jan. 14, 2014

(54) MULTICONTACT ADAPTIVE FASTENER CLIP

(75) Inventors: Michael Walter Smith, Lake Zurich, IL (US); Mark Fleydervish, Buffalo Grove, IL (US); Michael Anthony Giugliano, Elgin, IL (US); Edward Sacha, Chicago, IL (US); Daniel James Dickinson, Arlington Heights, IL (US)

(73) Assignee: Termax Corporation, Lake Zurich, IL (US)

( * ) Notice: Subject to any disclaimer, the term of this patent is extended or adjusted under 35 U.S.C. 154(b) by 295 days.

(21) Appl. No.: 11/277,107

(22) Filed: Mar. 21, 2006

(65) Prior Publication Data

US 2006/0168773 A1    Aug. 3, 2006

Related U.S. Application Data

(60) Continuation-in-part of application No. 10/704,094, filed on Nov. 7, 2003, now abandoned, which is a division of application No. 10/164,963, filed on Jun. 7, 2002, now Pat. No. 6,718,599, application No. 11/277,107, which is a continuation-in-part of application No. 10/906,209, filed on Feb. 9, 2005, now Pat. No. 7,178,850.

(60) Provisional application No. 60/301,364, filed on Jun. 25, 2001, provisional application No. 60/353,515, filed on Feb. 1, 2002.

(51) Int. Cl.
*F16B 5/06* (2006.01)

(52) U.S. Cl.
USPC .......................................................... 24/295

(58) Field of Classification Search
USPC ........... 24/289–295, 297, 458, 453, 666, 667, 24/669, 701, 702; 411/508–511, 45–48, 411/182, 480, 533, 902, 903, 349, 913, 112, 411/173–175; 403/397, 408.1, 326; 52/716.7, 718.06, 716.5, 716.6, 716.8, 52/718.03, 704; 174/138 D; 296/146.7, 296/39.1, 214
See application file for complete search history.

(56) References Cited

U.S. PATENT DOCUMENTS

| | | | | |
|---|---|---|---|---|
| 2,143,603 | A * | 1/1939 | Lombard | 411/447 |
| 2,885,754 | A * | 5/1959 | Munse | 24/293 |
| 5,636,891 | A * | 6/1997 | Van Order et al. | 296/37.7 |
| 6,021,986 | A * | 2/2000 | Murdock | 248/289.11 |
| 6,629,809 | B2 * | 10/2003 | Vassiliou | 411/173 |
| 7,168,138 | B2 * | 1/2007 | Lubera et al. | 24/295 |

* cited by examiner

*Primary Examiner* — James Brittain
(74) *Attorney, Agent, or Firm* — CGIP Law (57) ABSTRACT

A fastener clip includes a base plate and a pair of laterally offset arms extending from the base plate. The fastener clip is operative for insertion into a hole (slot) defined in a first engagement structure, such as a vehicle chassis. At least four wings extend from the arms. Each wing includes at least one engagement portion including a depressed portion formed on each wing, wherein each depressed portion is operative to engage a portion of the hole. According to one embodiment, each arm is coupled to at least one wing at a distal end of each arm (i.e., a long arm), so that each wing extends inwardly towards the base plate. According to an alternative embodiment, each arm (i.e., a short arm) is coupled to the at least one wing, so that each wing extends outwardly away from the base plate.

24 Claims, 10 Drawing Sheets

MULTICONTACT ADAPTIVE FASTENER CLIP

RELATED APPLICATIONS

This application is a continuation in part claiming priority from an application entitled, "Vehicles Comprising Assemblies Having Fastener with Ergonomically Balanced Removal to Insertion Force Ratio" and U.S. patent application Ser. No. 10/704,094, now abandoned, which is a divisional application of non-provisional application Ser. No. 10/164,963, filed Jun. 7, 2002, now U.S. Pat. No. 6,718,599, which claims priority to provisional applications 60/301,364, filed Jun. 25, 2001, 60/327,814, filed Oct. 9, 2001, and 60/353,515 filed Feb. 1, 2002, all of which are incorporated herein by reference in their entirety.

This application is a continuation in part of U.S. patent application Ser. No. 10/906,209, now U.S. Pat. No. 7,178,850, filed on Feb. 9, 2005, the entire disclosure of which is incorporated herein by reference.

FIELD OF THE INVENTIONS

The invention relates generally to devices for fastening objects, and more particularly to a fastener clip for insertion into an engagement structure such as a vehicle chassis, a hollow substrate, a wall, a plate or any suitable surface.

BACKGROUND OF THE INVENTIONS

A number of devices and fasteners are currently available for fastening panels, such as body panels and automobile interior trimpieces, to the chassis of a vehicle. As used herein, a body panel refers, for example, to any interior or exterior body panel on a vehicle, a plastic interior trimpiece or an interior trimpiece made out of any suitable material, such as wood, steel, aluminum, magnesium, carbon fiber or any other suitable material. Additionally, the panel may be any suitable exterior body panel, such as a trim piece, molding, fender, bumper, quarter panel or door panel. The chassis of the vehicle may include any substrate, plate, body panel, structural framework, chassis component or subcomponent, wall or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, once the body panel is attached to the chassis via the fastener device, the fastener device is typically required to secure the panel to the chassis under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of production tolerances, such as various dimensions amongst, for example, the body panels as well as the vehicle chassis. Conventional fastener devices typically do not adequately minimize or eliminate buzzing and rattling and do not sufficiently accommodate variations in production tolerances.

Fastener clips are known for attaching body panels to an automobile chassis For example, fastener clips are known for including a base plate and four stepped arms extending from the base plate. Each stepped arm includes four incremental steps (stair-steps suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. Also, the steps typically cut onto each arm during manufacture, and also require twisting of each wing on the fastener clip in order to engage the slot in the vehicle chassis. As a result, only an edge or a portion of an edge of each of the steps engages the hole in the vehicle slot.

If the tolerances in production of the slot in the vehicle chassis or in the trimpiece exist, for example, the engagement of one portion of the hole in the chassis with one of the discrete steps on one of the arms may not provide suitable frictional engagement with another corresponding discrete step of another arm because the step size is greater than the variation of the slot height. Further, the engagement of steps of different height for different arms may not engage the slot, resulting in different levels of frictional engagement and thus causing rocking of the fastener. As a result, less than all four of the arms will make suitable engagement with the slot of the vehicle chassis. Twisting of the body panel will be likely more prevalent because less four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

Fastener clips having at least two arms and a depression formed on the arms are known. For example, the depression may be formed by stamping. The depressed portions formed on each arm engage a hole in a vehicle chassis. The depressed portion formed on each arm increases an extraction force relative to an insertion force. However, when the fastener is rotated relative to the hole in the vehicle chassis, the depressed portion may lose some of its ability to maintain the high level of extraction force. For example, since each arm is typically located laterally offset from each other, each arm engages opposite sides of the hole in the vehicle chassis. Since the fastener clip only has two arms, there are only two engagement portions between the two arms and the hole in the vehicle chassis. As a result, the fastener clip may tend to rotate or pivot about the engagement portions between the arms and hole on the fastener clip, especially in response to certain forces and torques. Consequently, less than all four of the arms will make suitable engagement with the hole in the vehicle chassis. Once the fastener clip is rotated or pivoted about the engagement portion, the extraction force may be reduced.

DETAILED DESCRIPTION OF THE PREFERRED EMBODIMENTS

A fastener clip includes a base plate and a pair of laterally offset arms extending from the base plate. The fastener clip is operative for insertion into a hole (slot) defined in a first engagement structure, such as a vehicle chassis. At least four wings extend from the arms. Each wing includes at least one engagement portion, including a depressed portion formed on each wing, wherein each depressed portion is operative to engage a portion of the hole. According to one embodiment, each arm is coupled to at least one wing at a distal end of each arm (i.e., a long arm), so that each wing extends inwardly towards the base plate. According to an alternative embodiment, each arm (i.e., a short arm) is coupled to the at least one wing, so that each wing extends outwardly away from the base plate.

Among other advantages, the fastener clip relatively easily facilitates attachment of a body panel, such as an interior or exterior body panel with the first engagement structure, such as the vehicle chassis. The engagement portion including the depressed portion adapts to variations and production tolerances, such as variations in the dimensions of the slot formed within the vehicle chassis and variations in body panels to maintain a high level of extraction force relative to the insertion force. For example, the engagement portion continuously adapts to variations in thickness and dimensions of the vehicle body panel slots and/or tabs in the body panel and other variations. Each wing independently engages the slot of the vehicle chassis in a continuous rather than discrete manner. Each wing adapts to changes, such as chassis flexing and vibrations of a wide range of amplitudes and frequencies and other conditions.

The engagement portion, along with the accompanying depressed portion on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome.

The relatively high level of extraction force, characteristic of the fastener clip, securely attaches the body panel, such as an interior trim piece, to the vehicle chassis. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or been plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches a body panel to the vehicle chassis such that the fastener clip improves reliability both in the short term and in the long term, while further improving vehicle safety and quality.

Figure 1:
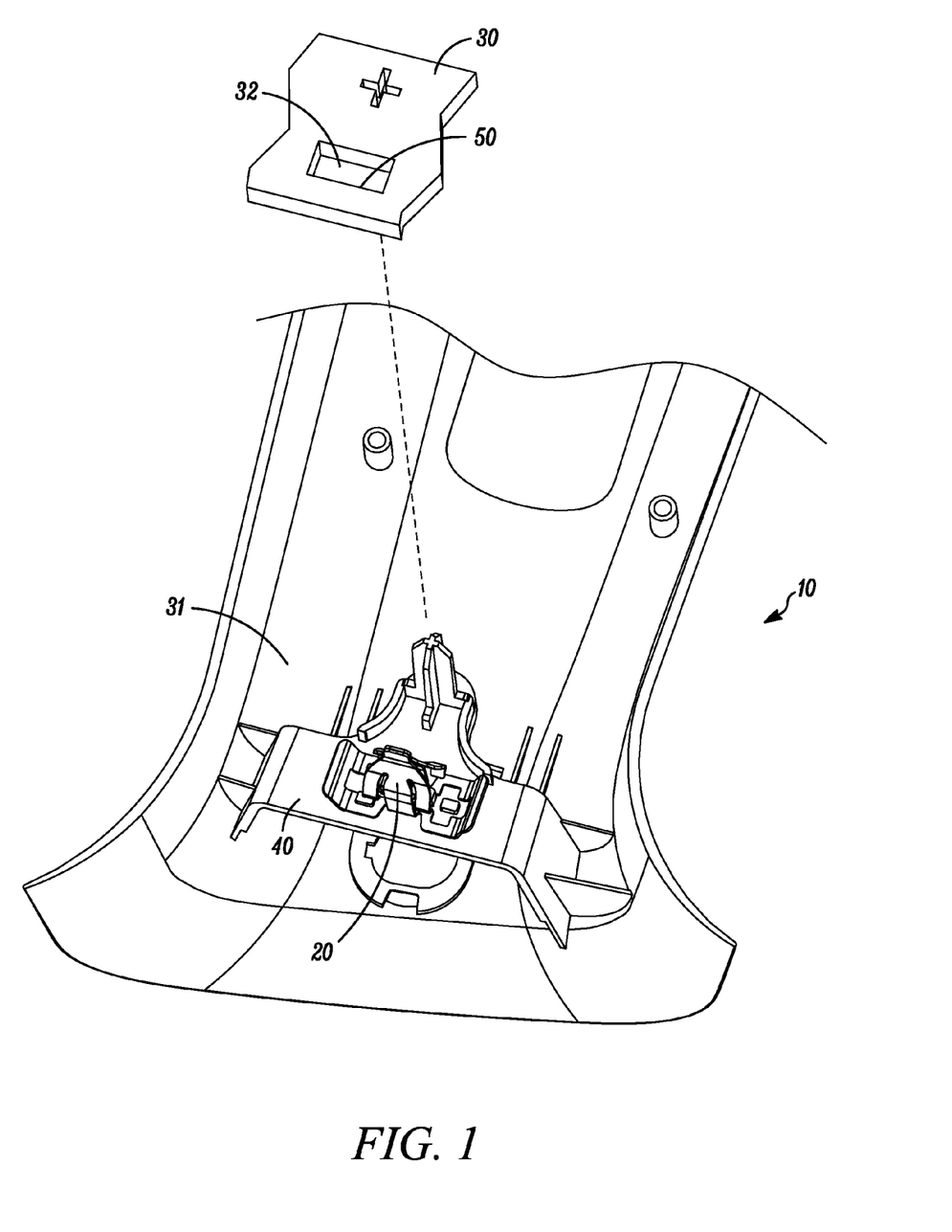
FIG. 1 is a perspective view of a body panel assembly in accordance with an exemplary embodiment.

FIG. 1 is a perspective view of a body panel assembly 10 including a fastener clip 20 for insertion into a first engagement structure 30 having a hole 32. The fastener clip 20 is also fastened to a second engagement structure 40, such as a tower, post portion or mounting portion of a body panel 31. The second engagement structure 40 may be part of a plastic trimpiece, such as the body panel 31 or any other suitable type of body panel. The second engagement structure 40 and/or body panel 31 may be made out of plastic, carbon fiber, fiberglass, steel, aluminum, magnesium, leather, rubber, wood or any other suitable type of material.

According to one embodiment, the second engagement structure 40 may be a plastic trimpiece cover for a B-pillar in a vehicle chassis and may be made out of polyvinyl chloride or any other suitable type of plastic or other suitable material as is known in the art. Alternatively, the fastener clip 20 may attach the second engagement structure 40 and/or body panel 31 to an A-pillar, C-pillar, D-pillar, E-pillar or any other suitable pillar within the vehicle. Typically, an A-pillar refers to the first pillar from the front of a vehicle (i.e., a windshield pillar); B-pillar refers to the second pillar from the front of the vehicle; C-pillar refers to a third pillar from the front of the vehicle, if applicable; and so on. According to one embodiment, the first engagement structure 30 is a part of a vehicle body or chassis or any suitable portion of a vehicle. For example, the fastener clip 20 may couple or otherwise suitably attach to the first engagement structure 30, such as a vehicle chassis, structural framework, body panel, wall, substrate or any other suitable object. Additionally, the first engagement structure 30 may include a suitable plate, a panel, another body panel or any structure into which the fastener clip 20 is inserted. The fastener clip 20 provides a high level of fastening force and is ideally suited to applications involving fastening relatively large body panels to the vehicle chassis or any other "heavy duty" applications.

Figure 2:
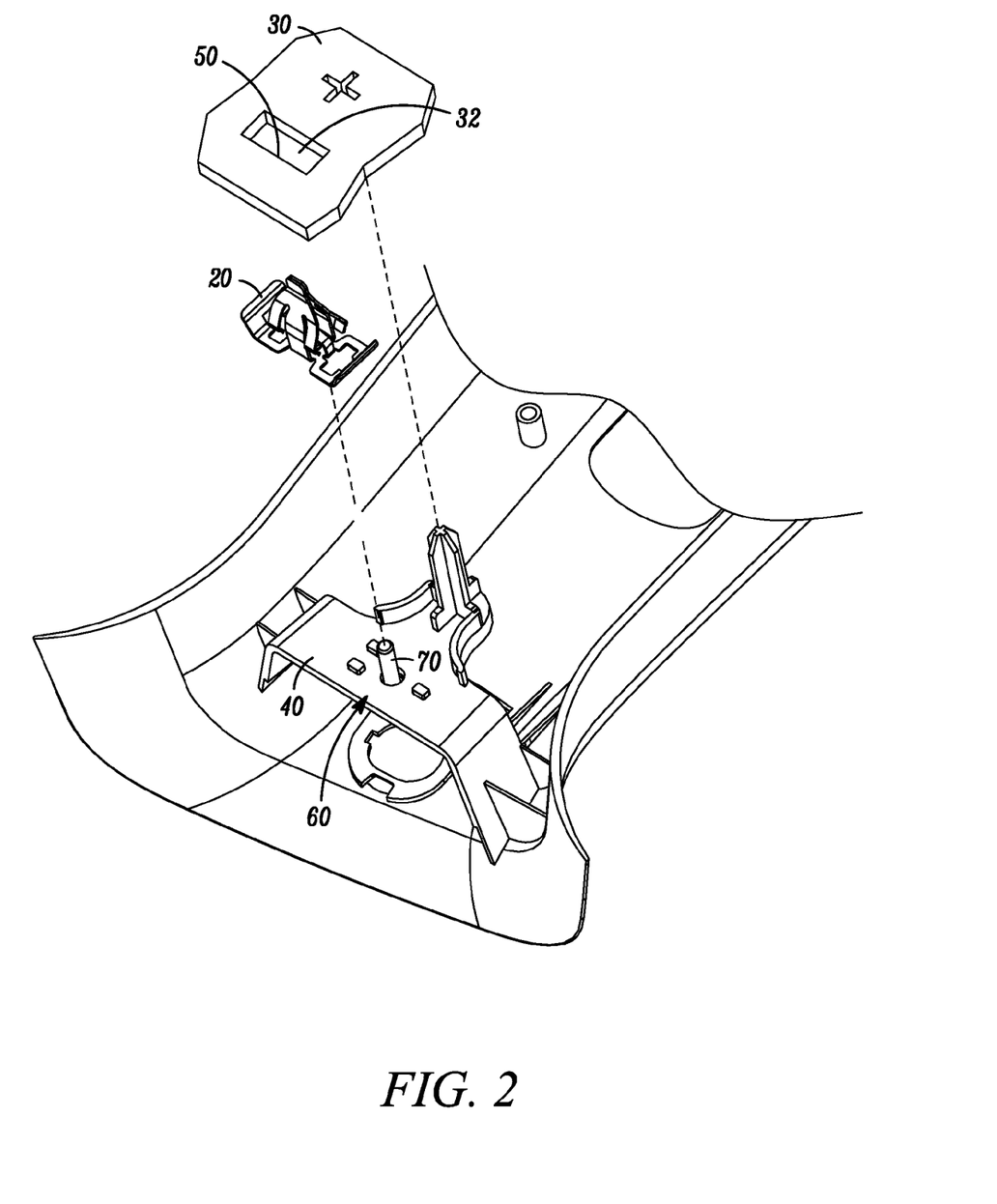
FIG. 2 is a perspective exploded view of the body panel assembly according to one embodiment.

FIG. 2 is an exploded view of the body panel assembly 10. The fastener clip 20 according to one embodiment of the invention, is operative for insertion into a hole 32 defined in the first engagement structure 30. The hole 32 may have any shape, such as a circle, a square, a rectangle, a pentagon, hexagon, a polygon, an n-sided polygon where n is a whole number, an ellipse and/or an oval or any suitable shape. Further, the inner perimeter of the hole 32, which may be any size, has a rim 50 for engaging the fastener clip 20. The second engagement structure 40 further includes a mounting plate 60, having a pattern to facilitate mounting of the fastener clip 20 either with or without a fastener 70 such as a screw, a bolt, a rivet, a pin, a fastener clip or any other suitable fastener.

It should be understood that the implementation of other variations and modifications of the body panel assembly 10 and its various aspects shown in the figures described will be apparent to those having ordinary skill in the art, and that the invention is not limited by these specific embodiments described. For example, the fastener clip 20 may couple any suitable object such as a panel, trim piece, seal, frame, headliner, instrument gauge, panel, or suitable assemble. Further, the fastener clip 20 may be coupled to the first engagement structure 30 in any suitable manner. Further, the fastener clip 20 may be coupled to the second engagement structure 40 on a side, bottom or top of the second engagement structure 40 or on any other suitable part of the second engagement structure 40, such as on an interior trimpiece inner surface of the body panel 31, or any part of any tower or post.

Figure 3:
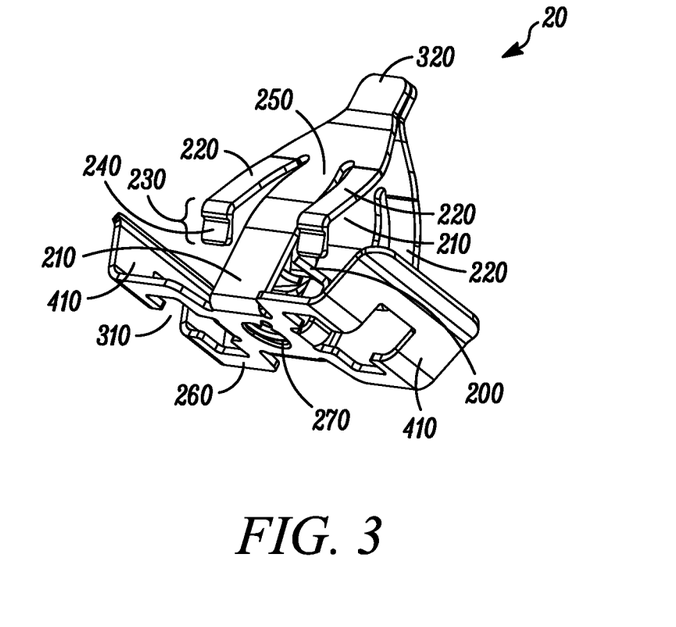
FIG. 3 is a perspective view of a fastener clip according to one embodiment.

FIG. 3 is a perspective view of the fastener clip 20 according to one embodiment of the invention. The fastener clip 20 includes a base plate 260 and a pair of laterally offset arms 210 extending from the base plate 260. At least four wings 220 extend from the arms 210. For example, each arm 210 nay have two wings 220 as shown, for a total of four wings 220. Alternatively, the fastener clip 20 may have any number of arms or one arm 210 may have one wing 220, while the other arm 210 has three wings 220 and so on. According to one embodiment, at least two or more wings 220 extend from each arm 210. For example, each arm 210 may further include two, three, four, or more wings 220. According to one alternative embodiment, the fastener clip 20 includes three or more arms 210.

Each wing 220 includes at least one engagement portion 230. The engagement portion 230 includes a depressed portion 240 formed on each wing 220, such that each depressed portion 240 is operative to engage a portion of the hole 32 defined in the first engagement structure 30. According to the embodiment shown, each of the pair of laterally offset arms 210 is coupled to the at least four wings 220 at a distal end 250 (i.e. distal relative to and opposite the base plate 260). Accordingly, the wings 220 extend inwardly toward the base plate 260.

The depressed portion 240 may include, for example, an abrupt edge, a gradual angled edge such as a curve, a single angled edge, a discrete multiangled edge and a pointed edge or any suitable edge. The depressed portion 240 is formed on the engagement portion 230 of each wing 220 so as to increase an extraction force for the fastener clip 20 when removed from the hole 32 formed on the first engagement structure 30. The depressed portion 240 and/or the engagement portion 230 may be sized to suitably engage hole 32 of the first engagement structure 30 in order to obtain the desired level of extraction force. According to one embodiment, the depressed portion 240 may be a depression formed on wings 220. For example, the depressed portion 240 may be manufactured by stamping wings 220 to form the depressed portion 240. The size and shape of the depressed portion 240 may be formed in any suitable manner in order to permit relatively easy insertion of the fastener clip 20 into the first engagement structure 30 while increasing the extraction force. According to one exemplary embodiment, during insertion, the coupling force between fastener clip 20 and first engagement structure 30 may be, for example, about 5 to 15 lbs. or less, while the extraction force may be about 20 to 50 lbs. or more. Any other suitable amount of insertion and extraction force is contemplated. For example, the amount of insertion and extraction force for any other application, large or small would require corresponding appropriate sized and characteristics of the engagement portion 233. According to one embodiment, the wings 220 are formed with engagement portions 230 having different characteristics.

According to one embodiment, any part of the depressed portion 240 of the wing 223 engages the rim 50 formed by the hole 32 within the first engagement structure 30. The depressed portion 240 may further include characteristics such as an edge formed to include either a single curvature or multiple curvatures to engage the rim 50. The amount of curvature, the depth of the depression, the width of the depression and the number of depressions may be sized in order to provide the desired level of extraction force due to the frictional engagement between any portion of the depressed portion 240 and the rim 50 of the first engagement structure 30.

According to one embodiment, the depressed portion 240 may include prongs, ribs, teeth or any other suitable structure on, for example, an edge of the depressed portion 240 for complementary engagement with the first engagement structure 30. The depressed portion 240 may form edges of any angle or curvature, such as, for example, zero degrees, 30 degrees, 45 degrees, 60 degrees, 90 degrees, 145 degrees and so on. For example, any part of the depressed portion 240 may continuously and frictionally engage the rim 50 with sufficient springing force in order to compensate for and automatically adapt to both production tolerances within the hole 32 of the first engagement structure 30, the body panel 31, the second engagement structure 40 and also to compensate for thermal expansion, vibrations and other environmental conditions over very long periods of time. For example, if the body panel assembly 10 is subject to vibrations, rattles or otherwise moves relative to the second engagement structure 40, the frictional engagement between the depressed portion 240 and the rim 50 may continuously move or change while maintaining frictional engagement either continuously or discretely, and thus adapt to and dampen or prevent any resulting movement. As a result, fastener clip 20 may reliably attach the second engagement structure 40 to the first engagement structure 30 via a secure coupling over long periods of time and under varying conditions.

According to one embodiment, the depressed portion 240 includes a dimple or suitable depress formed by including a gap between one or more stampings so that the depressed portion 240 includes a dimple or lip for further increasing the frictional engagement with the first engagement structure 30. Alternatively, the depressed portion 240 may include two consecutive curved depressions.

According to one embodiment, arms 210 are coupled via a joined portion 320 at a distant portion away and opposite from the base plate 260, as shown in FIG. 3. For example, the joined portion 320 may provide a guide for inserting the fastener clip 20 into the hole 32 of the first engagement structure 30 during assembly.

The fastener clip 20 further includes a first aperture 270 formed within the base plate 260. The base plate 260 may attach to the second engagement structure 40 via the mounting plate 60 (FIG. 2) formed or attached to the second engagement structure 40. According to one embodiment, the base place 260 has a design or pattern for complementary engagement with a mounting plate 60 within the second engagement structure 40.

Figure 4:
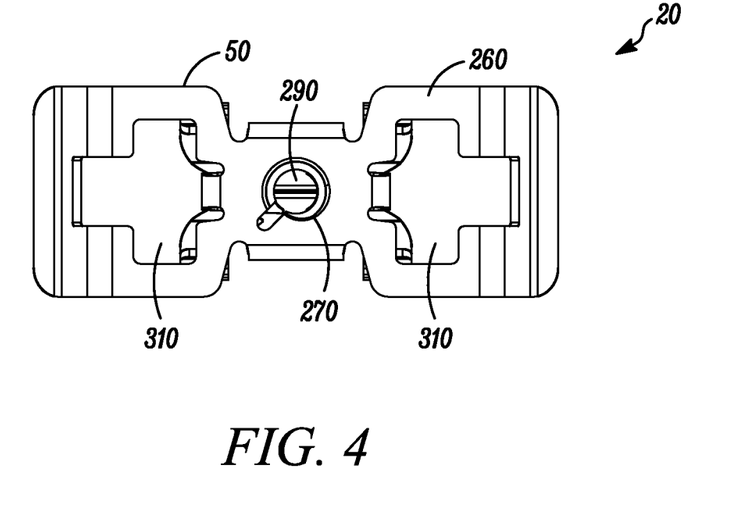
FIG. 4 is a bottom view of the fastener clip according to one embodiment.

FIG. 4 is a bottom view of the fastener clip 20 according to one embodiment. The base plate 260 is further shown including a base web 310. The base web 310, for example, provides a suitable mounting point for properly aligning the fastener clip 20 to the second engagement structure 40 via the corresponding mounting plate 60. The base web 310 may include a key or pattern matching the pattern of the mounting plate 60 of the second engagement structure 40 to facilitate mounting the fastener clip 20. According to one embodiment, the pattern of the base web 310 is standardized so that the same or similar type of fastener clip 20 may be used on more than one second engagement structure 40. For example, if the same fastener clip 20 is desired for use with multiple types of interior trim pieces, then the design of the mounting plate 60 may be standardized to match the pattern of the base web 310.

Figure 5:
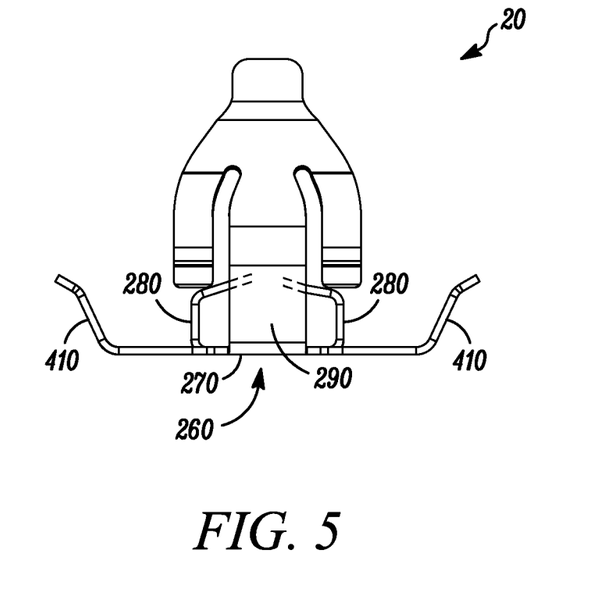
FIG. 5 is a side view of the fastener clip according to one embodiment.

FIG. 5 is a side view of the fastener clip 20 according to one embodiment. According to this embodiment, fastener clip 20 includes at least one collar 40 formed on each side of the fastener clip 20. The collar 410 provides a springing force when the fastener clip 20 is inserted into the hole 32 of the first engagement structure 30. The collar 410 provides, for example, a clamp load when the collar 410 engages the outer surface of the first engagement structure 30. Accordingly, the collar 410 engages or clamps the outer surface of the first engagement structure 30 when the engagement portion 230 of the wings 220 engages the rim 50 and/or the inner portion of the first engagement structure 30. The springing force provided by the collar 410 securely engages and stabilizes the fastener clip 20 in the presence of various forces when inserted into the first engagement structure 30.

According to yet another embodiment, the fastener clip 20 further includes a second engagement portion 280 extending from the base plate 260 to form a second aperture 290 generally vertically concentrically aligned with the first aperture 270. For example, the first aperture 270 and/or the second aperture 290 may include (or form) a portion of a thread or one or more threads. Accordingly, the first aperture 270 is operative to engage or pass through the fastener 70 such as a screw a bolt, a rivet, a pin, a fastener clip or any other suitable fastener. Similarly the second engagement portion 280 engages the fastener 70, such as screw or bolt, via the second aperture 290 while the first aperture 270 also engages the fastener (i.e. via the thread). As a result the second engagement portion 280 provides a prevailing torque even if the frictional engagement between the first aperture 270 and the fastener 704 somehow diminishes over time (i.e., due to vibrations, thermal expansion, contraction or any other phenomena).

Figure 6:
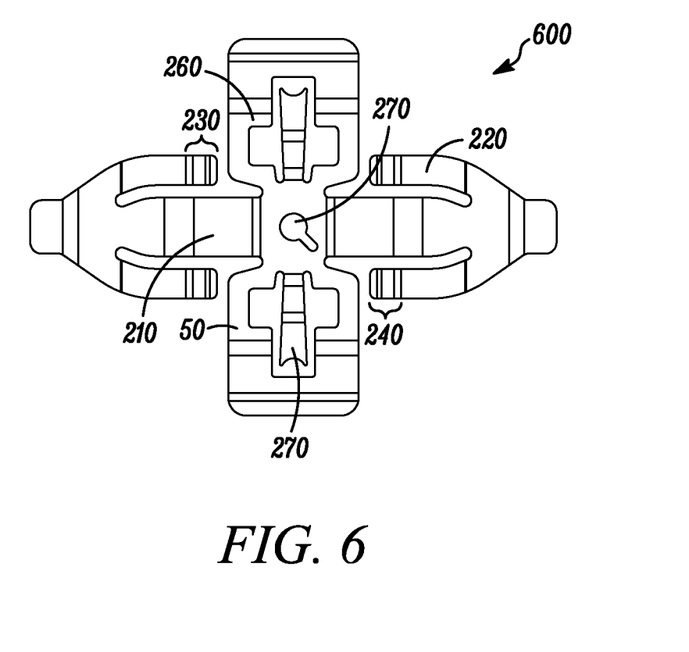
FIG. 6 is a top view of a strip of sheet metal on a progressive die according to one embodiment.

FIG. 6 illustrates a stamping 600 of the fastener clip 20 according to one embodiment of the invention. The fastener clip 20 may be formed on a strip of sheet metal such as steel, aluminum, magnesium, brass, plastic or any suitable material. The stamping 600 for the fastener clip 20 may be formed from the strip of sheet metal on a progressive die. The steps employed to form the fastener clip 20 may include blanking to cut a desired shape in the strip of sheet metal while maintaining a carrying tab to facilitate progressively moving the strip to the next die. Other steps may include the formation of shear tabs and punches to form channels and/or holes, as is known in the art.

Each arm 210 and wing 220, for example, may be formed by a parallel fold line formed with the base plate 260. According to one embodiment, the fastener clip 20 is formed from a continuous solid structure, such as a sheet of steel, and then hardened, for example, by means of a heat treatment, as is known in the art. According to one embodiment, rubber, plastic, paint or any suitable coating or covering may be applied to the fastener clip 20 in order to reduce buzzing, squeaking and rattling (BSR) during operation of the vehicle.

Figure 7:
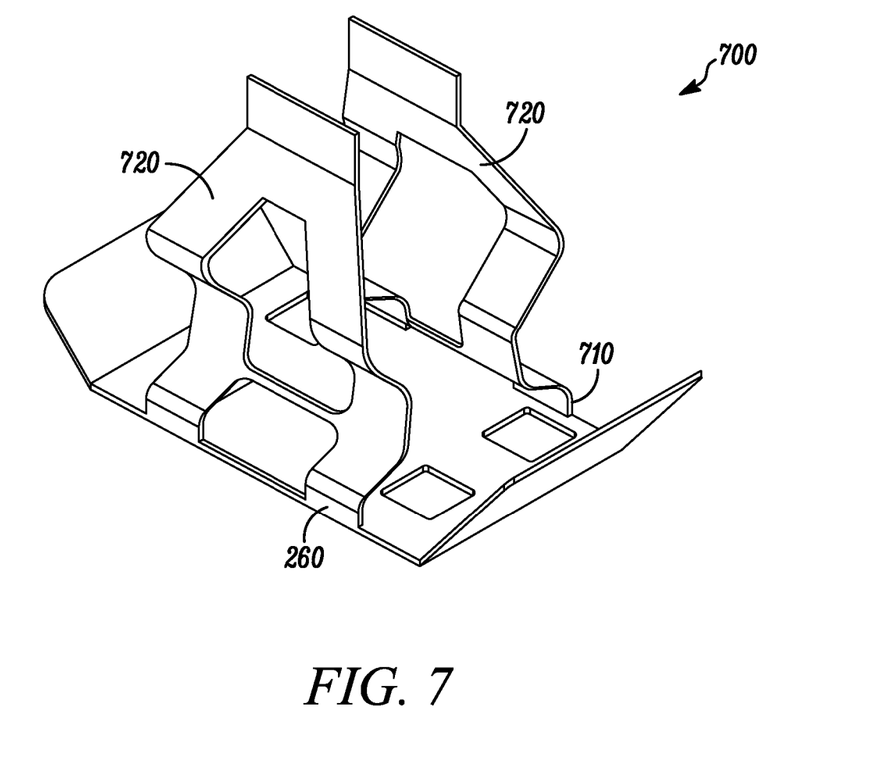
FIG. 7 is a perspective view of the fastener clip according to another embodiment.

FIG. 7 illustrates a perspective view of the fastener clip 700 according to another embodiment. According to this embodiment, each arm 710 is coupled to at least two wings 720 at a proximate end of each arm 710. The proximate end of the arm 710 is the end closest to the base plate 260. According to this embodiment, each wing 720 extends outwardly away from the base plate 260. Accordingly, arms 710 are relatively short compared to the arms 210 described with respect to FIGS. 2 through 6.

Figure 8:
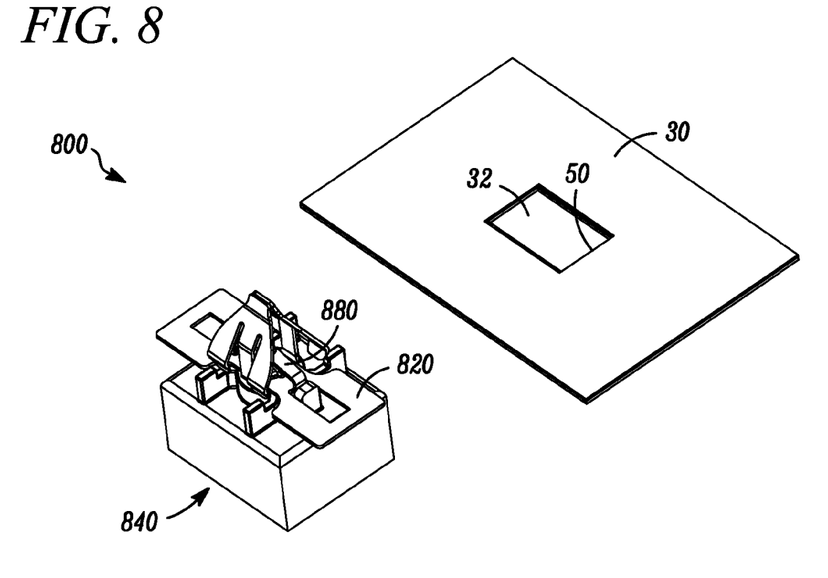
FIG. 8 is a perspective view of a body panel assembly in accordance with an alternative embodiment.

FIG. 8 is a perspective view of a body panel assembly 800, including a fastener clip 820 for insertion into the first engagement structure 30 and corresponding engagement structure 840, such as a tower, post portion or suitable mounting portion of a body panel, such as body panel 31 according to another alternative embodiment. The fastener clip 820 functions in a manner similar to the fastener clip 20, except the end or collar of the base plate are substantially coplanar (i.e. flat or with a suitable degree of bending to achieve a springing force). The coplanar collar(s) or ends of the base plate 820 are contrasted with the collar(s) 410 that are shown in FIGS. 3 and 5, which have a decreased upward bend. For example, the fastener clip 820 may be well suited for low-clearance applications such as in a headliner or other suitable applications. Additionally, the fastener clip 820 may be well suited for low clearance applications such as in a headliner or other suitable applications.

Figure 9:
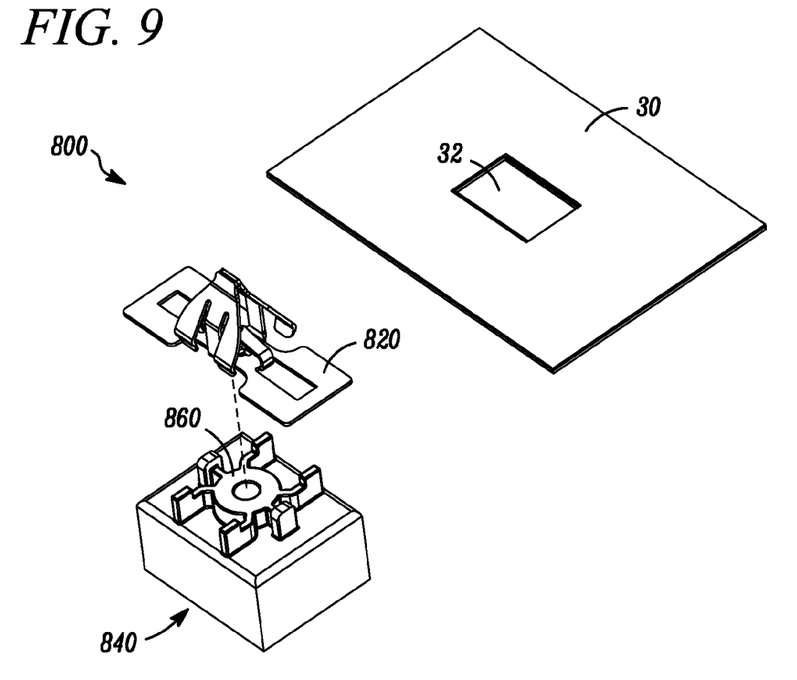
FIG. 9 is a perspective exploded view of the body panel assembly according to another alternative embodiment.

FIG. 9 is an exploded view of the body panel assembly 800. The fastener clip 820 is, according to one embodiment of the invention, operative for insertion into the hole 32 defined in the first engagement structure 30. The corresponding engagement structure 840 further includes a mounting plate 860 having a pattern to facilitate mounting of the fastener clip 820.

Figure 10:
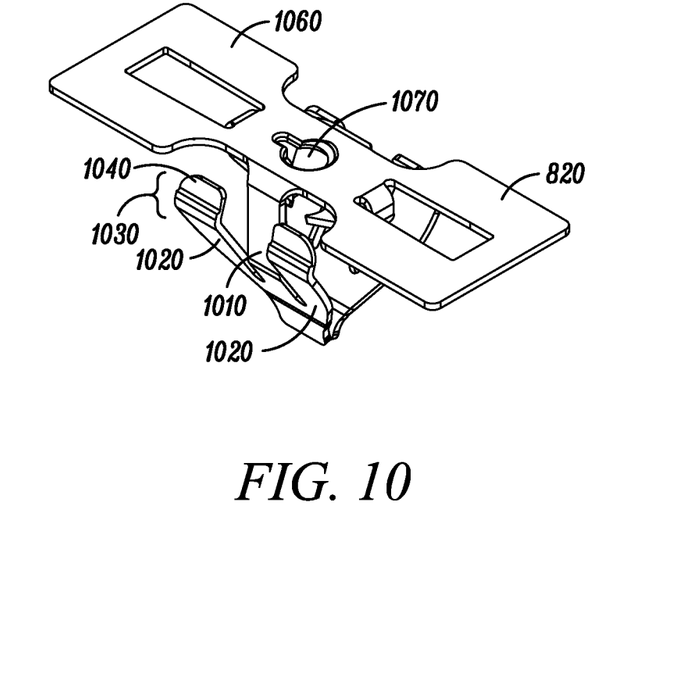
FIG. 10 is a bottom perspective view of the fastener clip according to the alternative embodiment.

FIG. 10 is a perspective view of the fastener clip 820 according to one embodiment of the invention. The fastener clip 820 includes a base plate 1060 and a pair of lateral offset arms 1010 extending from the base plate 1060. According to one embodiment, at least two wings 1020 extend from each arm 1010. According to the embodiment shown, at least four wings 1020 extend from the arms 1010. Any suitable number of wings 1020 may extend from each arm 1010.

Each wing 1020 includes at least one engagement portion 1030. The engagement portion 1030 includes a depressed portion 1040 formed on each wing 1020 such that each depressed portion 1040 is operative to engage a portion of the hole 32 defined in the first engagement structure 30. According to the embodiment shown, each of the pair of laterally offset arms 1010 is coupled through at least four wings 1020 at a distal end of the base plate 1060 in a similar manner as previously shown with regards to FIG. 3. The engagement portion 1030 and the depressed portion 240 are similar to the depressed portion 240 and the engagement portion 230 as previously described with regards to FIG. 3.

Figure 11:
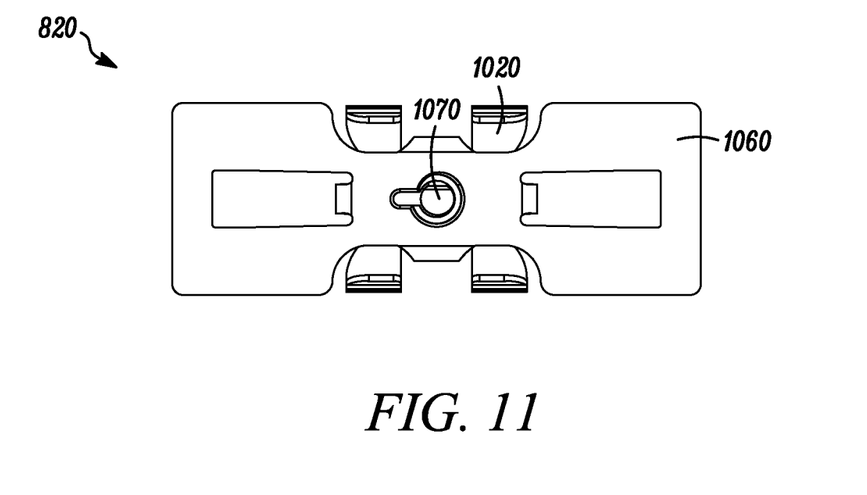
FIG. 11 is a bottom view of the fastener clip according to the alternative embodiment.

FIG. 11 is a bottom view of the fastener clip 820 according to one embodiment. The fastener clip 820 is further shown including the base plate 1060. The base plate 1060, for example, provides a suitable mounting point or properly aligning the fastener clip 820 corresponding engagement structure 840 via the corresponding mounting plate 860. The mounting plate 860 of the corresponding engagement structure 840 facilitates mounting of the fastener clip 820.

Figure 12:
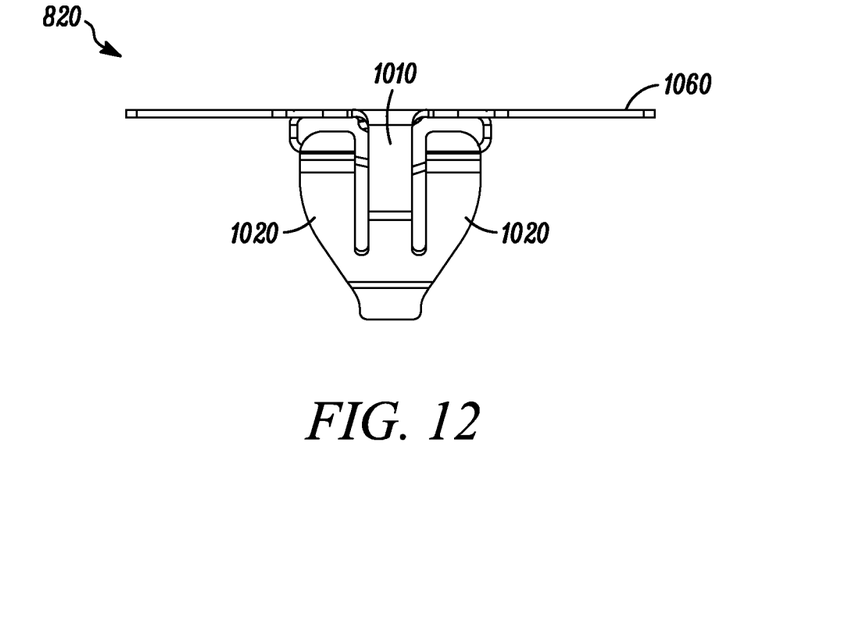
FIG. 12 is a lateral side view of the fastener clip according to the alternative embodiment.

FIG. 12 is a side view of the fastener clip 820 according to one embodiment. The fastener clip 820 includes a relatively flat (i.e. substantially planar) base plate 1060 in contrast to the relatively bent collars 410 of the fastener clip 20 as shown in FIG. 5. For example, the flat base plate 1060 is suitable for applications such as in an automobile interior headliner, and thus the height of the clip is limited. According to this embodiment the distance between the first engagement structure 30 and the corresponding engagement structure 840 is relatively small.

The flat base plate 1060 further stabilizes the fastener clip 820 when mounted on the mounting plate 860 of the corresponding engagement structure 840. For example, the flat base plate 1060 may also provide a springing force when the fastener clip 820 is inserted in the hole 32 of the first engagement structure 30. The ends of the flat base plate 1060 provide, for example, a clamp load when the ends of the base plate 1060 engages the outer surface of the first engagement structure 30. Accordingly, the flat ends of the base plate 1060 engages or clamps the outer surface of the first engagement structure 30 when the engagement portion 1030 of the wings 1020 engage the rim 50 and/or the inner portion of the first engagement structure 30. The spring force provided by the base plate 1060 securely engages and stabilized the fastener clip 820 in the presence of various forces when inserted into the first engagement structure 30.

Figure 13:
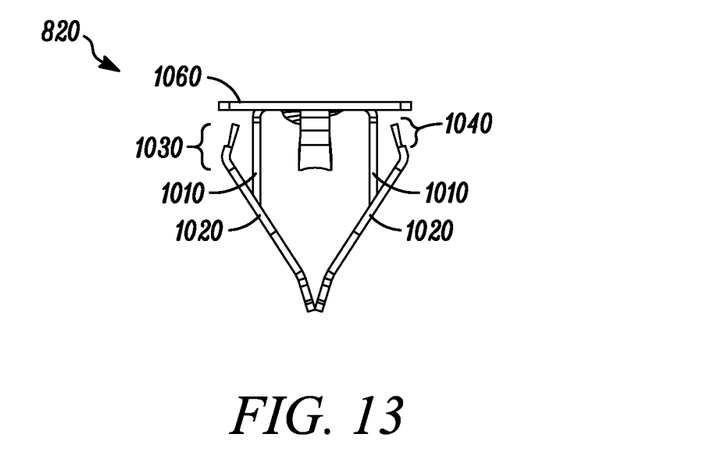
FIG. 13 is a side view of the fastener clip according to the alternative embodiment.

FIG. 13 is another side view of the fastener clip 820 according to yet another embodiment of the invention. According to this embodiment, the fastener clip 820 differs from the fastener clip 20, as illustrated in FIGS. 3 and 5, at least where the first engagement structure 30 engages the collar 410 and the engagement portion 230. For example, the first engagement structure 30 engages the collar 410 and the engagement portion 230 at a relatively high distance (i.e., offset or height) away from the base plate 1060. In contrast, as shown in FIG. 13, once the fastener clip 820 is inserted into the hole 32 of the first engagement structure 30, the engagement portion 1030 and the base plate 1060 engages opposite sides of the first engagement structure 30 resulting in the first engagement structure 30 to become approximately flush with the base plate 1060. As a result, the fastener clip 820 nay be used in suitable applications where space between the first engagement structure 30 and the corresponding engagement structure 840 is limited.

According to one embodiment, the height of the arms 1010 may be less than the height of the arms 210 as shown with respect to FIGS. 3 through 5. The fastener clip 820 may be suitable for applications where there is less room between the first engagement structure 30 and the corresponding engagement structure 840 such as, for example, within the headliner of an automobile. The headliner of an automobile may include a sheet of steel forming the inner portion of the metallic roof having a first engagement structure 30 such as a tower and a hole 32 that is operative to receive the fastener clip 820. For example, the fastener clip 820 may be mounted to the corresponding engagement structure 840, such as a suitable mounting point on a semi-rigid headliner. According to one embodiment, the corresponding engagement structure 840 is a part of a visor attaching point or any suitable location.

Figure 14:
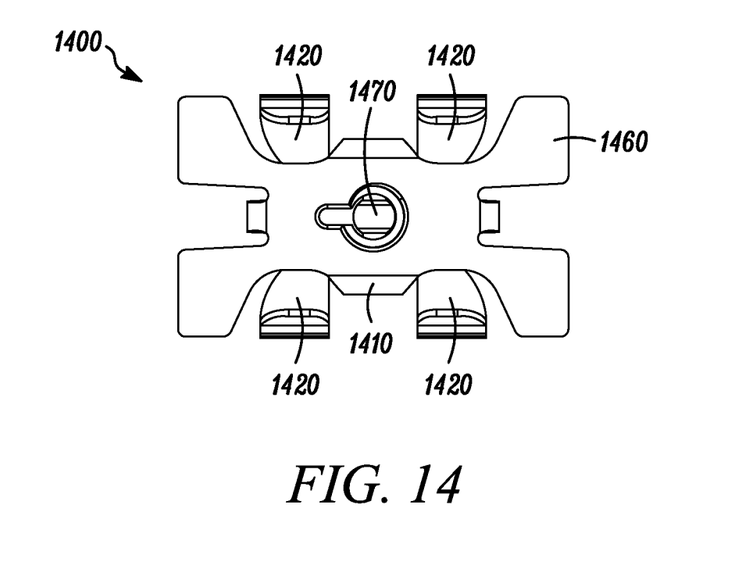
FIG. 14 is a bottom view of the fastener clip according to yet another alternative embodiment.
Figure 15:
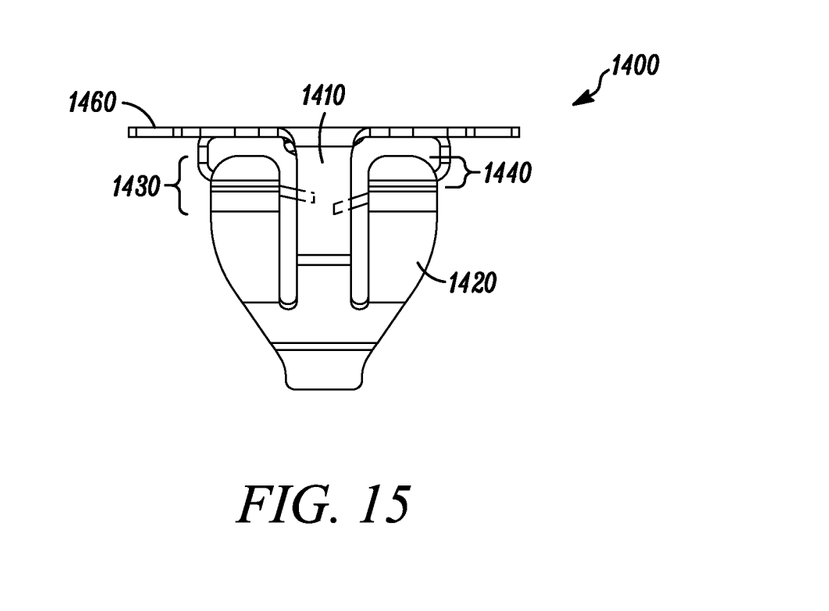
FIG. 15 is a longitudinal side view of the fastener clip according to the alternative embodiment.
Figure 16:
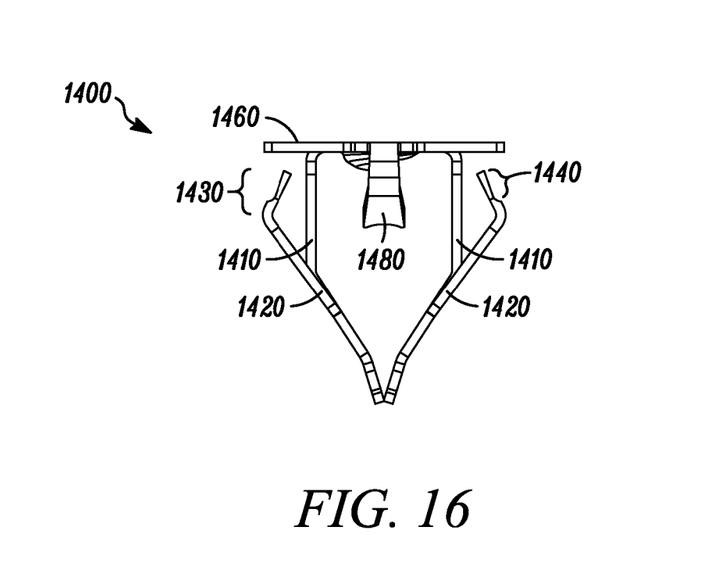
FIG. 16 is a side view of the fastener clip according to the alternative embodiment.
Figure 17:
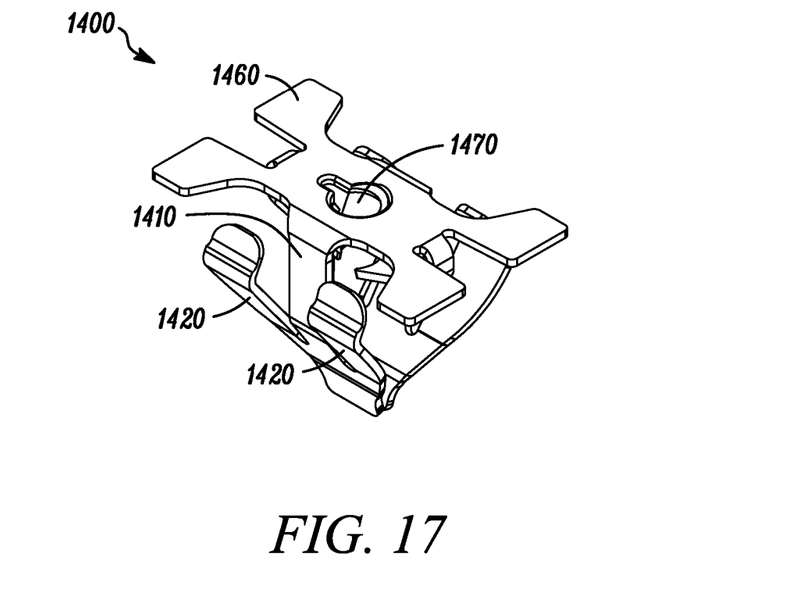
FIG. 17 is a perspective view of the fastener clip according to the alternative embodiment.

As shown in FIG. 14, a fastener clip 1400 includes arms 1410, wings 1420, a base plate 1460 and a first aperture 1470. According to this embodiment, the base plate 1460 is illustrated with a different mounting pattern suitable for mounting with mounting plate 860 or any other suitable other suitable mounting plate. The base plate 1460 includes a key or pattern for matching the pattern of the mounting plate 860. Therefore, the mounting plate 860 may be used with different types of patterns formed on the base plate 1460, as previously described. FIGS. 15, 16 and 17 further show different views of the fastener clip 1400.

Although the fastener clips 20, 820, and 1400 are described at least for suitable engagement with the first engagement structure 30 such as an automobile chassis, one skilled in the art would readily find use of the fastener clip 20 in other applications, such as aircraft, spacecraft, boating or furniture, home construction and building construction or any other suitable application.

Among other advantages, the fastener clips 20, 820, and 1400 relatively easily facilitate attachment of the second engagement structure 40, 840 such as an interior or exterior body panel, to the first engagement structure 30, such as the vehicle chassis. The engagement portion 230, 1030 including the depressed portion 240, 1040 adapts to variations and production tolerances, such as variations in the slot 32 formed within the vehicle chassis and variations in body panels. For example, the engagement portion 230, 1030 adapts to variations in thickness and dimensions of the vehicle body panel slots 32 and/or tabs in the body panel and other variations. Each wing 220, 1020 independently engages the slot 32 of the vehicle chassis and adapts to changes, such as chassis flexing and vibrations of a wide range of amplitudes and frequencies and other changes. Further, the engagement portion 230, 1030 along with the accompanying depressed portion 240, 1040 on each wing 220, 1020 permits relatively easy insertion of the fastener clips 20, 820, and 1400 into a slot formed within the vehicle chassis while providing a relatively high level of extraction force from the vehicle chassis. As a result, attachment of the body panel assembly 10, 800 onto the vehicle chassis requires a relatively low level of insertion force, and as a result provides many ergonomic advantages. For example, the relatively low level of insertion force is particularly advantageous for assembly line operators who repetitively insert body panels onto the vehicle chassis. The relatively low level of insertion force required for inserting the body panel assembly 10, 800 into the vehicle chassis results in fewer injuries to the assembly workers, including injuries related to repetitive stress syndrome.

The relatively high level extraction force characteristic of the fastener clip 20, 820, and 1400 securely attaches the body panel 31 such as an interior trim piece to the vehicle chassis as previously stated. Further, the fastener clip 20, 820, and 1400 continually adapts to changes in environmental conditions such as vehicle flexing vibration and thermal expansion. For example, the fastener clip 20, 820, and 1400 may adapt to changes in thermal expansion, especially due to the differences in thermal expansion rates between dissimilar metals or materials. This typically occurs when the vehicle chassis and/or plastic components such as the interior trim panels are attached to the metal vehicle chassis. Yet another advantage is that the fastener clip 20, 820, and 1400 is relatively easy to manufacture using relatively inexpensive manufacturing processes and materials. The use of the fastener clip 20, 820, and 1400 decreases production costs, increases productivity and efficiency and decreases overall assembly cost. The fastener clip 20, 820, 1400 securely attaches the body panel 31, 840 to the vehicle chassis, such that the fastener clip 20, 820, and 1400 improves fastening reliability both in the tong term and in the short term while further improving vehicle safety.

It is understood that the implementation of other variations and modifications of the present invention in its various aspects will be apparent to those of ordinary skill in the art and that the invention is not limited to the specific embodiments described. It is therefore contemplated to cover by the present invention any and all modifications, variations or equivalents that fall within the spirit and scope of the basic underlying principles disclosed and claimed herein.

What is claimed is:

1. A fastener clip comprising:
   a base plate;
   a pair of laterally offset arms extending from the base plate; and
   at least four wings extending from the arms wherein each wing includes at least one engagement portion including a depressed portion having a non-uniform thickness formed on each wing, and not in an edge of each wing.

2. The fastener clip of claim 1 wherein each arm is coupled to the at least four wings at a distal end of each arm opposite the base plate, wherein each wing extends inwardly towards the base plate.

3. The fastener clip of claim 1 wherein the depressed portion includes at least one of: an abrupt edge, a gradual-angled edge, a single-angled edge, a discrete multiangled edge and a pointed edge.

4. The fastener clip of claim 1 wherein the base plate further includes a first aperture operative to engage a fastener.

5. The fastener clip of claim 4 wherein the fastener clip further includes a second engagement portion extending from the base plate to form a second aperture generally vertically concentrically aligned with the first aperture and operative to engage the fastener, and the fastener further includes at least one of: a screw, a bolt, a rivet, a pin and a clip.

6. The fastener clip of claim 1 wherein the base plate further comprises a base web.

7. The fastener clip of claim 1 wherein the fastener clip is operatively insertable into a hole defined in an engagement structure such that the hole defined in the engagement structure forms a rim and each depressed portion is operative to engage at least a portion of the rim on the engagement structure.

8. The fastener clip of claim 1 wherein the pair of laterally offset arms are coupled via a joined portion at a distant end opposite the base plate.

9. The fastener clip of claim 1 wherein the at least four wings are symmetrical.

10. The fastener clip of claim 1 wherein the base plate has bent opposite ends.

11. A fastener clip comprising:
    a base plate;
    a pair of laterally offset arms extending from the base plate; and
    at least two wings extending from each arm at a distal end from the base plate and extending towards the base plate wherein each wing includes at least one engagement portion including a depressed portion a depressed portion having a non-uniform thickness formed on each wing, and not in an edge of each wing.

12. The fastener clip of claim 11 wherein the depressed portion includes at least one of: an abrupt edge, a gradual-angled edge, a single-angled edge, a discrete multiangled edge and a pointed edge.

13. The fastener clip of claim 11 wherein the fastener clip is operatively insertable into a hole defined in an engagement structure, and the base plate has substantially coplanar opposite ends operative to engage the engagement structure in cooperation with at least one depressed portion also operative to engage at least a portion of the engagement structure.

14. A fastener assembly comprising:
    a body panel including a clip mount; and
    a fastener clip comprising:
       a base plate operably coupled to the clip mount;
       a pair of laterally offset arms extending from the base plate; and
       at least four wings extending from the arms wherein each wing includes at least one engagement portion including a depressed portion a depressed portion having a non-uniform thickness formed on each wing, and not in an edge of each wing.

15. The fastener assembly of claim 14 wherein each arm is coupled to the at least four wings at a distal end of each arm opposite the base plate, wherein each wing extends inwardly towards the base plate.

16. The fastener assembly of claim 14 wherein the depressed portion includes at least one of: an abrupt edge, a gradual-angled edge, a single-angled edge, a discrete multi-angled edge and a pointed edge.

17. The fastener assembly of claim 14 wherein the base portion further includes an aperture to engage a fastener.

18. The fastener assembly of claim 17 wherein the fastener is selected from at least one of a screw, a bolt, a rivet, a pin and a clip.

19. The fastener assembly of claim 14 wherein the fastener clip frictionally and continuously engages at least a rim of a hole defined in a vehicle chassis.

20. The fastener assembly of claim 14 wherein two of the arms are coupled via a joined portion at a distant portion from the base portion.

21. A vehicle comprising:
    a vehicle chassis;
    a body panel including a clip mount;
    a fastener clip operably coupled to a hole defined in the vehicle chassis comprising:
       a base plate coupled to the clip mount;
       a pair of laterally offset arms extending from the base plate; and
       at least four wings extending from the arms wherein each wing includes at least one engagement portion including a depressed portion a depressed portion having a non-uniform thickness formed on each wing, and not in an edge of each wing wherein each depressed portion is operative to engage at least a portion of the vehicle chassis.

22. The vehicle of claim 21 wherein each arm is coupled to the at least four wings at a distal end of each arm, opposite the base plate wherein each wing extends inwardly towards the base plate.

23. The vehicle of claim 21 wherein the depressed portion includes at least one of: an abrupt edge, a gradual-angled edge, a single-angled edge, a discrete multiangled edge and a pointed edge.

24. The vehicle of claim 21 wherein the base plate has bent opposite ends operative to engage the vehicle chassis in cooperation with at least one depressed portion also operative to engage at least a portion of the vehicle chassis.

* * * * *